(12) United States Patent
Sorensen (10) Patent No.: US 10,448,572 B2
(45) Date of Patent: Oct. 22, 2019

(54) CAM ACTUATED FINGER ASSEMBLY FOR ROTARY AUGER

(71) Applicant: CNH Industrial America LLC, New Holland, PA (US)

(72) Inventor: Doug Sorensen, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 171 days.

(21) Appl. No.: 15/635,773

(22) Filed: Jun. 28, 2017

(65) Prior Publication Data

US 2019/0000013 A1    Jan. 3, 2019

(51) Int. Cl.
*A01D 61/00*    (2006.01)
*A01D 41/14*    (2006.01)

(52) U.S. Cl.
CPC ......... *A01D 61/004* (2013.01); *A01D 61/008* (2013.01); *A01D 41/14* (2013.01)

(58) Field of Classification Search
CPC ...... A01D 57/00; A01D 57/03; A01D 89/002; A01D 61/004; A01D 61/008; A01D 75/182; A01D 41/14
USPC ............ 56/1, 226, 294, 364, 400, 12.4, 330, 56/16.4 R
See application file for complete search history.

(56) References Cited

U.S. PATENT DOCUMENTS

| | | | |
|---|---|---|---|
| 3,472,008 A | 10/1969 | Hurlburt | |
| 3,742,689 A | 7/1973 | Barrows et al. | |
| 6,591,598 B2 | 7/2003 | Remillard et al. | |
| 6,640,527 B2 | 11/2003 | Farley et al. | |
| 6,668,534 B2 | 12/2003 | Sheedy et al. | |
| 7,426,819 B2 | 9/2008 | Bich et al. | |
| 7,937,921 B2 * | 5/2011 | Lohrentz | A01D 75/182 56/294 |
| 8,091,327 B2 | 1/2012 | Batu | |
| 8,905,225 B2 | 12/2014 | Domokos et al. | |

(Continued)

FOREIGN PATENT DOCUMENTS

| | | |
|---|---|---|
| EP | 3064053 A1 | 9/2016 |
| EP | 3072381 A1 | 9/2016 |

(Continued)

OTHER PUBLICATIONS

European Search Report for European Patent Application No. 18179288.8 dated Nov. 15, 2018 (5 pages).

*Primary Examiner* — Robert E Pezzuto
(74) *Attorney, Agent, or Firm* — Peter K. Zacharias; Patrick M. Sheldrake (57) ABSTRACT

A crop gathering system for an agricultural harvester includes a tube having a tube wall. The tube wall defines an aperture extending through the tube wall. The crop gathering system also includes a rotary cam having an elongated shaft with a cam surface. The shaft extends inside the tube along an axis radially offset from the axis of the tube. The crop gathering system further includes a cam follower having a proximal end engaging the cam surface of the elongated shaft, and a distal end aligned with the aperture. The cam follower can be in the form of an auger finger that moves in and out of the tube wall as the tube is rotated to gather crop material and convey the crop material to a threshing system. A cam actuated finger assembly can be manufactured for installation in an auger of an agricultural harvester.

19 Claims, 7 Drawing Sheets

(56) References Cited

U.S. PATENT DOCUMENTS

| | | | |
|---|---|---|---|
| 2006/0252472 A1 | 11/2006 | Lanzinger | |
| 2013/0291510 A1 | 11/2013 | Lovett et al. | |
| 2014/0090959 A1 | 4/2014 | Domokos et al. | |
| 2015/0208582 A1* | 7/2015 | Patterson | A01D 61/008 460/20 |

FOREIGN PATENT DOCUMENTS

| | | | |
|---|---|---|---|
| GB | 919870 | | 2/1963 |
| GB | 1021778 | A | 3/1966 |

* cited by examiner

CAM ACTUATED FINGER ASSEMBLY FOR ROTARY AUGER

FIELD OF THE INVENTION

The present invention relates generally to rotary augers for agricultural harvesters, and more particularly to cam actuated finger assemblies for gathering crop material and carrying the crop material to feeder systems in the harvesters.

BACKGROUND

Crop gathering augers known in the art can be equipped with one or more components to assist with feeding crop material from the grain header into other parts of the harvester. For example, some augers include hard fingers made of steel or other rigid material that protrude radially outwardly from a central region of a drum. The fingers rake crops into an inlet opening of a feeder, which in turn conveys the crops into a threshing system of the combine. U.S. Pat. No. 6,640,527 to Farley et al., the content of which is incorporated by reference herein in its entirety, illustrates one example where auger fingers are used. As illustrated in Farley et al., the auger fingers are typically mounted on an auger finger shaft or other element located within the auger drum in an axially offset relation to a rotational axis of the drum, and protrude radially outwardly through holes in an outer cylindrical surface of the drum.

Figure 1:
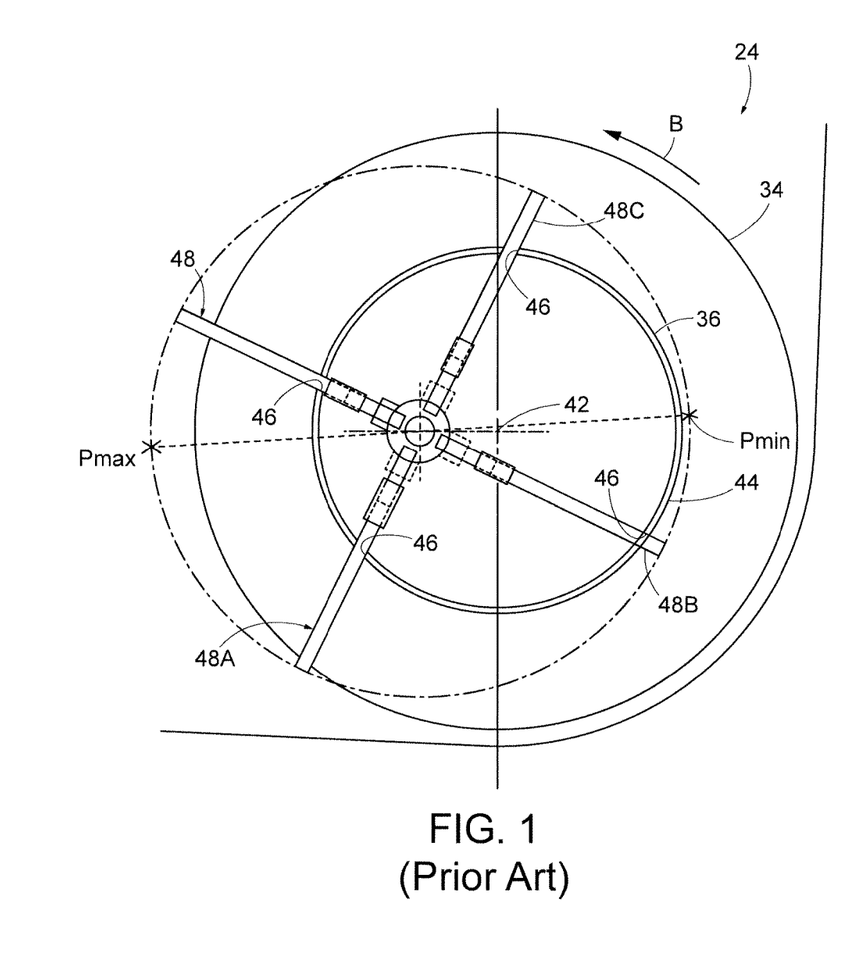
FIG. 1 shows a side view of a conventional auger finger assembly used on a rotary auger.

Referring to FIG. 1, a conventional rotating auger 34 is shown which uses auger fingers to convey crop material from a grain header 24. The rotation of auger 34 is denoted by arrow B, about axis 42 through a drum 36. Drum 36 is hollow, and it includes a longitudinally and angularly spaced array of holes 46 through an outer cylindrical surface 44. For purposes of illustration, four auger fingers are shown, namely auger fingers 48, 48A, 48B and 48C. Auger fingers 48, 48A, 48B and 48C are positioned in and extend outwardly through the holes 46. Each of the auger fingers 48, 48A, 48B and 48C telescopically extends outwardly through its associated hole 46 by a different amount, depending on the rotational position of drum 36 about axis 42. For example, auger finger 48 is shown in a first rotational position telescopically extending in an upwardly and forwardly directed orientation from drum 36, in preparation for raking. Auger finger 48A is shown in a second rotational position of drum 36, telescopically extending forwardly and downwardly in a raking position and orientation. Auger finger 48B is shown at a third rotational position of the drum, extending rearwardly and downwardly and mostly telescopically retracted into, the drum. Finally, auger 48C is shown in a rearward and upwardly directed orientation re-emerging from drum 36.

By rotation of drum 36 in the direction denoted by arrow B, auger fingers will project telescopically a substantial distance from drum 36 in a gathering or raking mode through a portion of a revolution of the drum, as seen with fingers 48 and 48A, and then will retract into drum 36 through another portion of the revolution, as seen with augers 48B and 48C, once the crop has been raked rearwardly into the feeder. Generally speaking, the auger fingers will latch onto and rake crop material as the fingers project more and more outwardly from the drum, and release crop material as the fingers are retracted more and more into the drum. As each auger finger rotates about the auger finger shaft, the auger finger reciprocates between a fully projected position, at which time the finger projects a maximum distance through the drum, and a fully retracted position, at which time the finger projects a minimum distance through the drum. Each auger finger reaches the fully projected position at some point while rotating around the front-facing side of the auger, and reaches the fully retracted position at some point while rotating around the rear-facing side of the auger.

One drawback of conventional auger finger assemblies is the failure of auger fingers to reach the fully retracted position at the appropriate point during a revolution. Some auger fingers reach the fully retracted position at a point too far past the location where the crop material must be released in order to be fed to the threshing system. In the auger shown in FIG. 2, for example, the fully retracted position $P_{min}$ is located on the rear-facing side of the drum, offset from the fully projected position $P_{max}$ by an angle of 180 degrees. It takes one-half revolution around the drum for each finger to move from its fully projected position $P_{max}$ to its fully retracted position $P_{min}$. Therefore, the auger fingers do not reach their fully retracted position $P_{min}$ until after they pass the inlet to the threshing system and continue their upward rotation toward the front-facing side of the drum. In this arrangement, crop material that clings to the ends of the auger fingers can be pulled past the inlet of the threshing system and carried back over the drum. Material that is carried back over to the front-facing side of the drum combines with new crop material entering the header. This can cause an accumulation of crop material that can plug up the auger and/or inlet to the feeder.

SUMMARY

The drawbacks of conventional rotary auger systems are addressed in many respects by a cam actuated auger finger assembly in accordance with the invention, and an auger that utilizes a cam actuated auger finger assembly in accordance with the invention.

According to one embodiment, a crop gathering system for an agricultural harvester, includes a cylindrical tube. The cylindrical tube includes a tube wall and a longitudinal axis, the tube wall defining at least one aperture extending through the tube wall. The crop gathering system also includes a rotary cam having an elongated shaft with a cam surface, the shaft extending inside the tube parallel to and radially offset from the longitudinal axis of the tube. In addition, the crop gathering system includes at least one cam follower. The at least one cam follower has a proximal end engaging the cam surface of the elongated shaft and a distal end aligned with the at least one aperture.

In the same embodiment, or in an alternative embodiment, the cam surface can include a first surface portion that is cylindrical and a second surface portion that is non-cylindrical.

In the same embodiment, or in an alternative embodiment, the cam surface can include a first surface portion that is cylindrical and a second surface portion that is radially relieved with respect to the first surface portion.

In the same embodiment, or in an alternative embodiment, the cam surface can include a first surface portion that is cylindrical and a second surface portion that is polygonal.

In the same embodiment, or in an alternative embodiment, the cam surface can include a first surface portion that is rounded.

In the same embodiment, or in an alternative embodiment, the at least one cam follower can extend normal to the shaft.

In the same embodiment, or in an alternative embodiment, the at least one aperture can include an aperture wall in engagement with the at least one cam follower.

In the same embodiment, or in an alternative embodiment, the tube and the cam follower can be rotatable relative to the shaft in a first direction of rotation.

In the same embodiment, or in an alternative embodiment, the at least one cam follower can be displaceable through the at least one aperture between a fully extended position and a fully retracted position relative to the tube wall.

In the same embodiment, or in an alternative embodiment, the distal end of the at least one cam follower can project a maximum distance in a radially outward direction from the tube wall.

In the same embodiment, or in an alternative embodiment, the distal end of the at least one cam follower can project a minimum distance in a radially outward direction from the tube wall when in a fully retracted position.

In the same embodiment, or in an alternative embodiment, the proximal end of the at least one cam follower can engage a first surface portion of the cam surface when in a fully extended position.

In the same embodiment, or in an alternative embodiment, the proximal end of the at least one cam follower can engage a second surface portion of the cam surface that is different from the first surface portion when in a fully retracted position.

In the same embodiment, or in an alternative embodiment, the fully extended position and the fully retracted position of the at least one cam follower can be angularly offset from one another with respect to the tube axis by an angle less than 180 degrees.

In the same embodiment, or in an alternative embodiment, the fully extended position and the fully retracted position of the at least one cam follower can be angularly offset from one another with respect to the tube axis by an angle between about 120 degrees and about 160 degrees.

In the same embodiment, or in an alternative embodiment, the at least one cam follower can be displaceable through the at least one aperture in a reciprocating motion in response to rotation of the tube and cam follower about the shaft.

In the same embodiment, or in an alternative embodiment, the crop gathering system can include at least one cam follower mount for connecting the at least one cam follower to the shaft.

In the same embodiment, or in an alternative embodiment, the at least one cam follower mount can include a block that is connected to the shaft and holds the proximal end of the at least one cam follower.

In the same embodiment, or in an alternative embodiment, the at least one cam follower mount can include a biasing element exerting a radially inward force on the at least one cam follower to maintain the proximal end of the at least one cam follower in constant engagement with the shaft.

In the same embodiment, or in an alternative embodiment, the at least one cam follower can be made of a plastic.

BRIEF DESCRIPTION OF THE DRAWINGS

For the purpose of illustration, there are shown in the drawings certain embodiments of the present invention, not shown to scale. It should be understood that the invention is not limited to the precise components, arrangements, dimensions, and instruments shown. Like numerals indicate like elements throughout the drawings. In the drawings.

DETAILED DESCRIPTION

Various terms are used herein to indicate the relative position of features on an agricultural combine, or the direction of relative movement of such features. Many of these terms are used to describe features that are on or associated with a rotary auger in a grain header. Unless noted otherwise, the terms "proximal", "proximally", "inward", "inwardly" and the like refer to positions that are closer to the center axis of the rotary auger, and directions that are oriented toward the center axis of the rotary auger. The terms "distal", "distally", "outward", "outwardly" and the like refer to positions that are farther from the center axis of the rotary auger, and directions that are oriented away from the center axis of the rotary auger, as compared to features that are referred to with the terms "proximal", "proximally", "inward", "inwardly" and the like.

Figure 2:
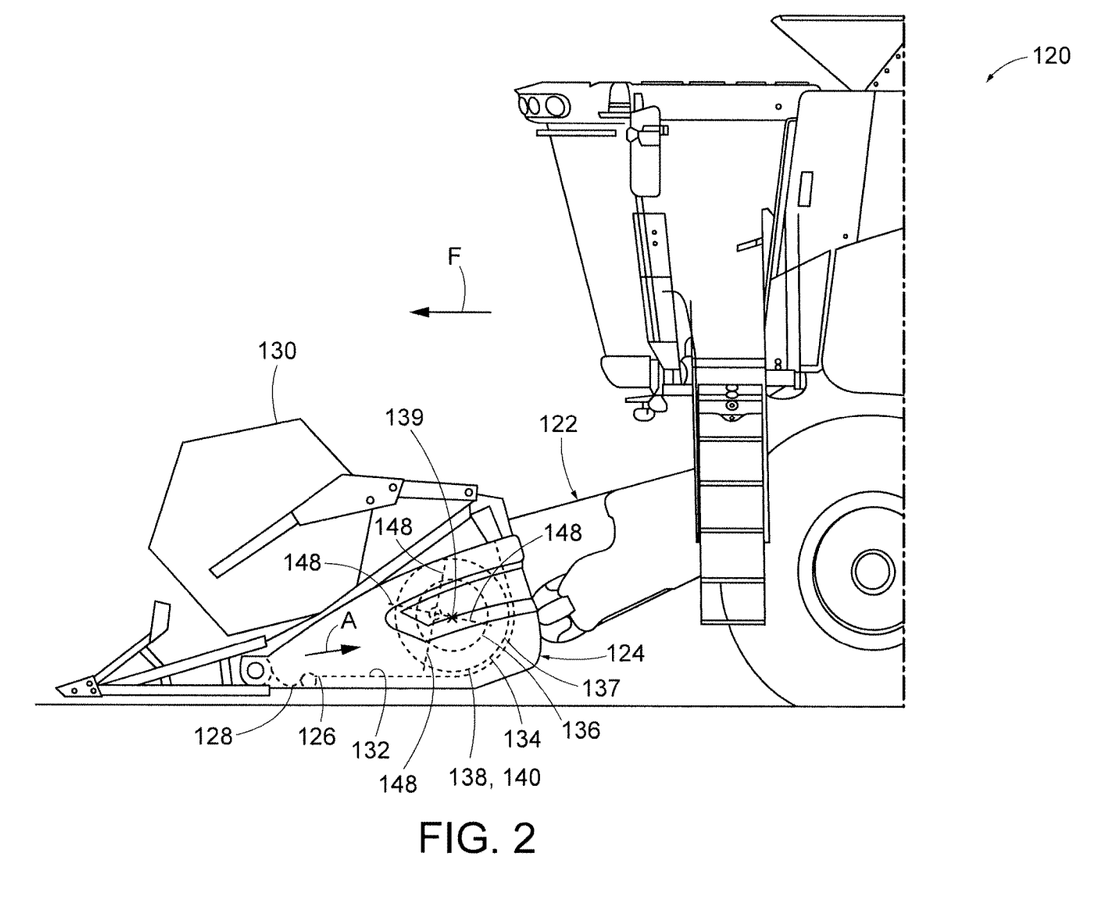
FIG. 2 is a side view of a front end of an agricultural combine, showing a header that utilizes a rotary auger and auger finger assembly in accordance with an embodiment of the invention.

Referring now to FIG. 2, the front end of an agricultural combine 120 is shown, including a feeder 122 supporting a grain header 124 operable for cutting and gathering crops containing grain, such as wheat and other grasses, legumes such as soybeans, and the like. Header 124 has a front end 126 including a cutter apparatus 128 extending along the width thereof, configured and operable for severing crops from the ground during movement of combine 120 in a forward direction, denoted by arrow F.

Header 124 includes a reel 130 disposed above cutter apparatus 128 and rotatable for directing the cut crops rearwardly onto and along a generally flat, horizontal floor or pan 132 of header 124, into a gathering auger 134 extending across the width of the header adjacent to the rear of pan 132. Auger 134 includes a hollow cylindrical tube or drum 136 featuring a tube wall or drum wall 137 and a longitudinal drum axis 139. Drum 136 has opposite right hand and left hand helical flights 138 and 140 extending around opposite end portions thereof, respectively.

Figure 3:
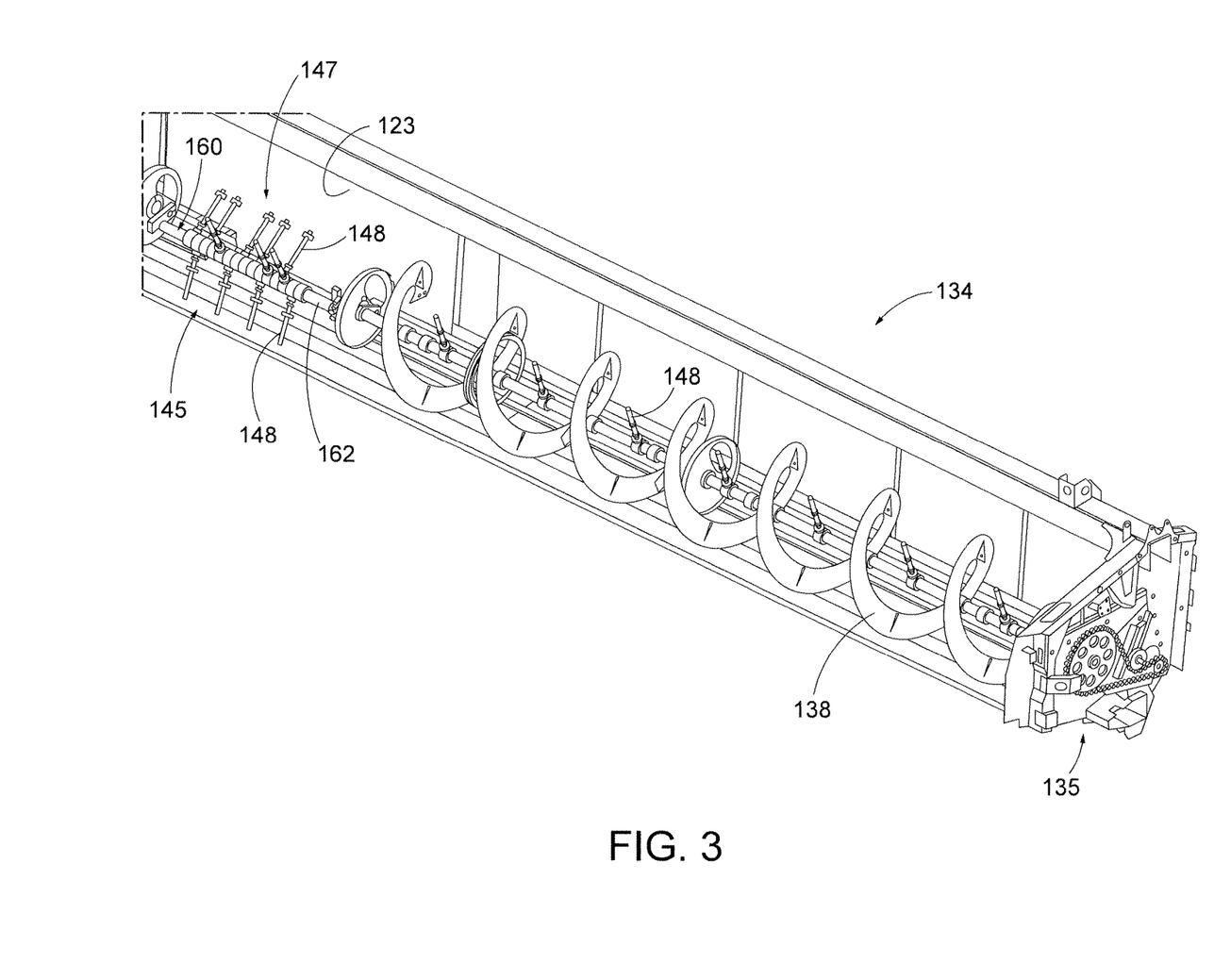
FIG. 3 is truncated perspective view of an interior section of the header of FIG. 2, with some elements omitted for clarity.
Figure 4:
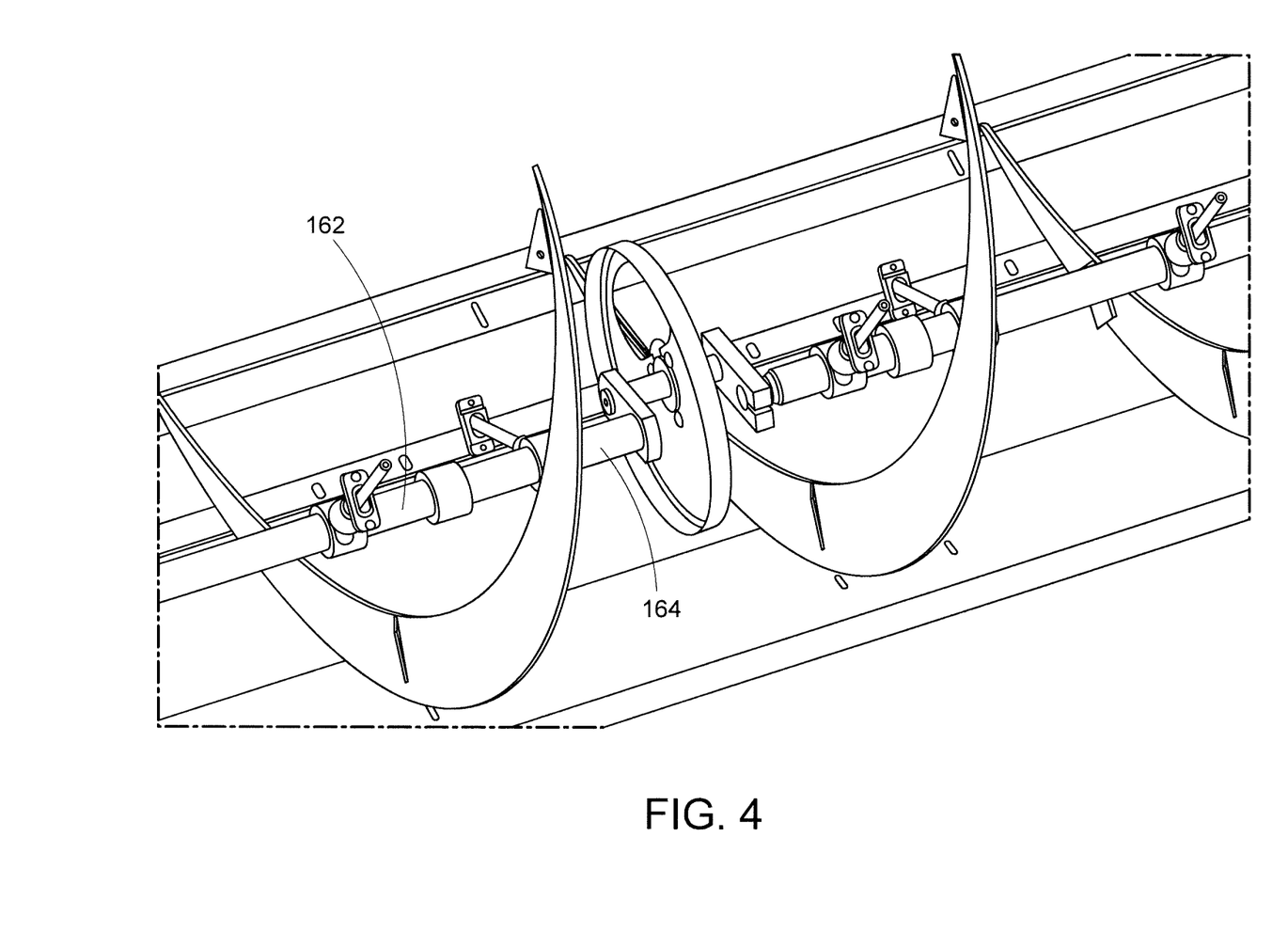
FIG. 4 is an enlarged truncated perspective view of an interior section of the header of FIG. 2, with some elements omitted for clarity.

Referring to FIGS. 3 and 4, auger 134 is shown with drum wall 137 removed to show components inside drum 136. Flights 138 and 140 are rotatable with auger 134 for conveying crop material from opposite end regions of the header toward the center region thereof. Feeder 122 includes an inlet opening 123 just rearwardly of the center region of header 124, for receiving the augered crops. Drum 136 has a tubular center section 145 between flights 138 and 140 that contains an auger finger assembly 147. Finger assembly 147 includes array of auger fingers 148 positioned at longitudinally and angularly spaced locations around the drum. Auger fingers 148 facilitate flow and induction of the crops into the inlet 123 of feeder 122. Auger 134 also includes auger fingers 148 along the outer regions and in between flights.

Figure 5:
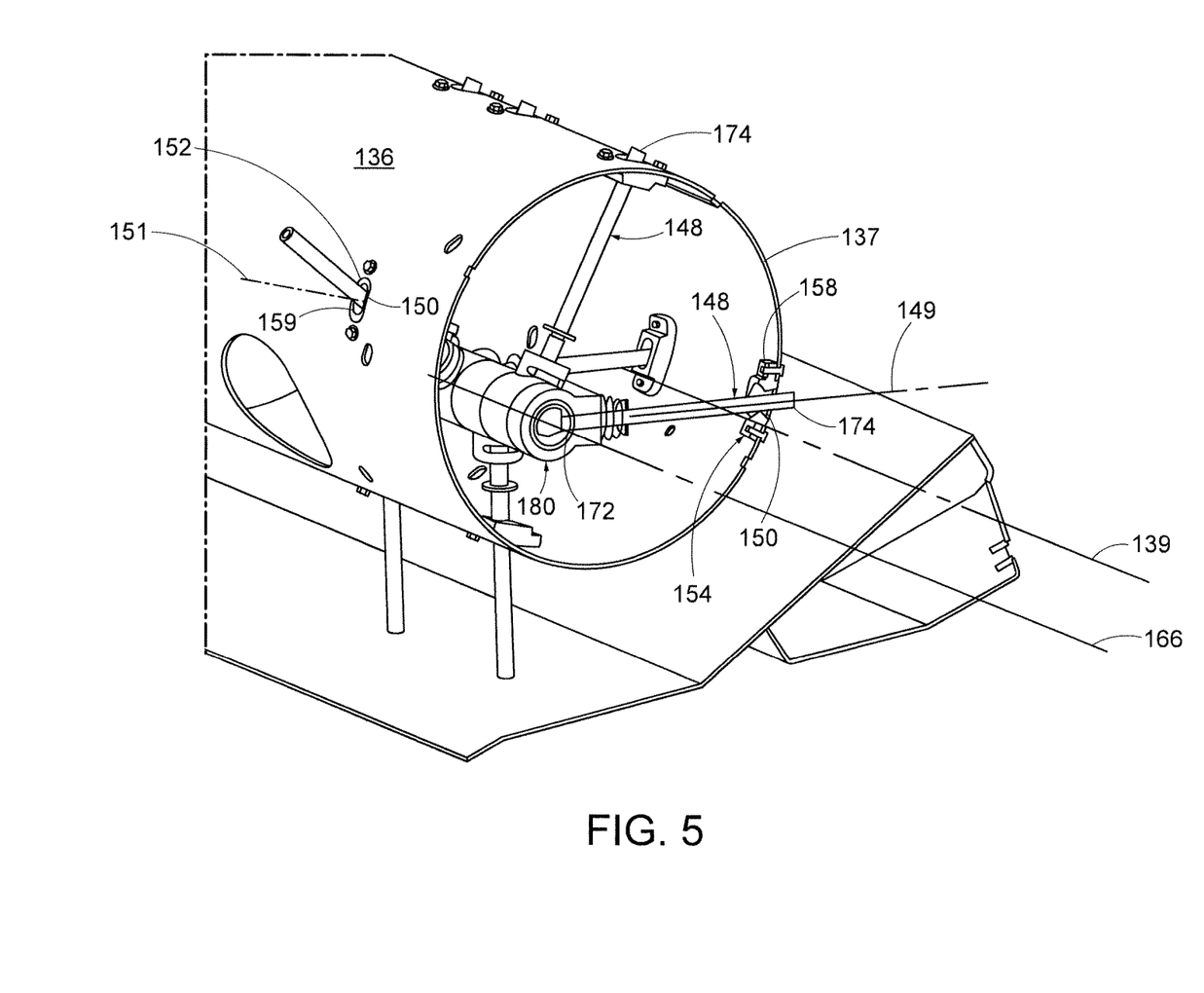
FIG. 5 is a truncated perspective view of components of the rotary auger of FIG. 2, taken through a section of the rotary auger.

Referring to FIG. 5, each auger finger 148 includes a proximal end 172 and a distal end 174 opposite the proximal end. In addition, each auger finger 148 has an elongated body with a longitudinal axis 149. As will be explained, auger fingers 148 are configured to rotate in unison with drum 136, and at the same time, move axially in a reciprocating motion. In particular, each auger finger 148 moves telescopically through drum 136 in a radially outwardly direction and a radially inwardly direction into the drum as the drum rotates. Distal ends 174 of auger fingers 148 project from drum 136 to facilitate a raking action that rakes or sweeps crop material into feeder 122. Drum wall 137 includes a plurality of apertures 150 extending through the drum wall. Each aperture 150 has an axis 151 that intersects with an axis 149 of one of the auger fingers 148, so that each auger finger is aligned with and received through one of the apertures. Each aperture 150 also has a sidewall 152.

Referring again to FIG. 3, auger 134 is operably connected to drive components 135 that rotate drum 136 around longitudinal axis 139. Drive components 135, which are schematically shown, can be in the form of gears, chains or other components configured for rotating drum 136. During operation, drive components 135 rotate drum 136 around drum axis 139. As drum 136 rotates, auger fingers 148 rotate in unison with the drum, as will be explained in more detail.

The proximal end 172 of each auger finger 148 is connected to a rotary cam 160 that extends through the interior of central section 145 of drum 136. Referring to FIG. 4, rotary cam 160 features a stationary crank shaft or "cam shaft" 162 mounted in central section 145 of drum 136. Cam shaft 162 features a cam surface 164 extending around the exterior of the cam shaft. In addition, cam shaft 162 has a longitudinal cam shaft axis 166 that extends substantially parallel to and radially offset from drum axis 139. The proximal end 172 of each auger finger is coupled to cam shaft 162 by a mount in the form of a "T-block" or bearing block 180.

Figure 6:
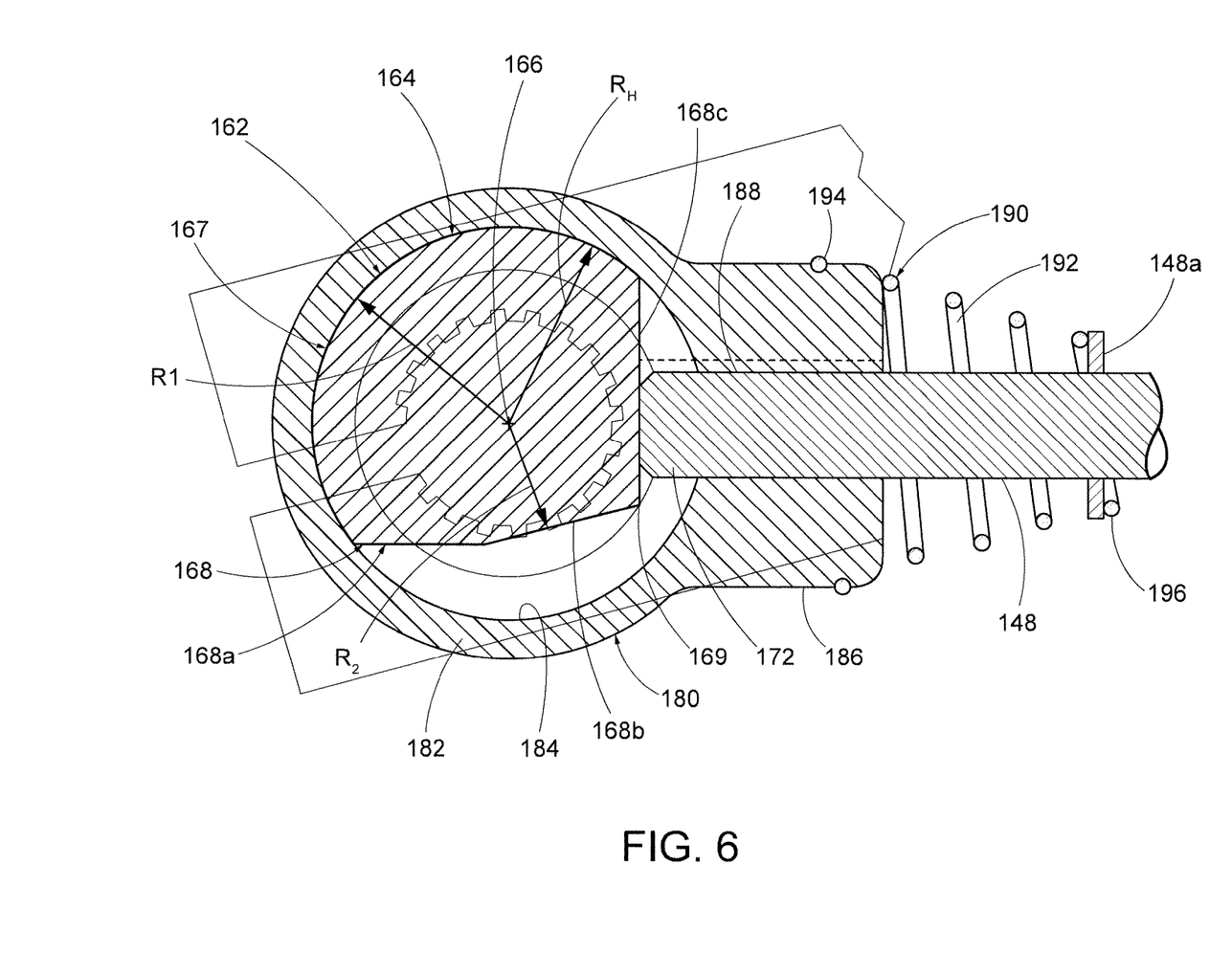
FIG. 6 is an enlarged cross sectional view of components of the auger finger assembly of FIG. 2.

Referring to FIGS. 5 and 6, each bearing block 180 includes a hub portion 182 with a through bore 184 that receives a section of cam shaft 162. Cam shaft 162 is received through bore 184 in a sliding arrangement that allows bearing block 180 and its associated auger finger to rotate a full 360 degrees around the cam shaft, but not move axially along the cam shaft. Each bearing block 180 also includes a sleeve portion 186 with a through passage 188. Each through passage 188 receives a proximal end 172 of one of the auger fingers 148. The proximal end 172 of each auger finger 148 projects into through bore 184 of hub portion 182, where the proximal end is maintained in contact with cam shaft 162. Cam surface 164 is preferably smooth to permit the proximal end 172 of each auger finger 148 to slidingly engage the cam surface as the auger finger and associated bearing block 180 rotates around the cam shaft.

Cam shafts in accordance with the invention can have a single continuous cam surface, for example a shaft having an elliptical cross sectional shape. Alternatively, cam shafts in accordance with the invention can have a discontinuous cam surface, such as a surface made up of multiple distinct surface portions. In the present example, cam surface 164 defines a plurality of surface portions, each portion having a different geometry. Each surface portion bears against the proximal ends 172 of auger fingers 148 as the auger fingers and drum 136 rotate. The geometry of each surface portion therefore acts on the proximal ends 172 of the auger fingers 148 to move each auger finger radially inwardly or outwardly with respect to cam shaft axis 166. A variety of surface portion configurations can be used to control the relative positions of auger fingers. For example, a cam surface in accordance with the invention can include at least one surface portion that pushes an auger finger radially outwardly so that the distal end of the auger finger extends a maximum distance from the tube wall, where the finger can grab onto crop material. The cam surface can also include at least one surface portion that allows an auger finger to retract radially inwardly, so that the distal end of the auger finger extends a minimum distance from the tube wall, or in the alternative, is retracted inside the aperture, with no portion of the finger extending outside the drum.

Cam surface 164 is "multi-faceted", meaning that the cam surface includes a plurality of distinct surface portions or faces around the shaft, each face having a unique shape, orientation, or other geometric characteristic. More specifically, cam surface 164 includes a first surface portion 167 having a first geometry and a second surface portion 168 having a second geometry distinct from the first geometry. First surface portion 167 is cylindrical in shape, with a radius $R_1$ that is slightly less than the radius $R_H$ of through bore 184. Second surface portion 168, in contrast, is non-cylindrical in shape. In addition, second surface portion 168 is radially relieved with respect to the first surface portion. The term "radially relieved", as used in this context, means that the distance $R_2$ between cam shaft axis 166 and any point on second surface portion 168 is less than the distance between the cam shaft axis and any point on first surface portion. All points on second surface portion 168 are therefore positioned closer to cam shaft axis 166 than any point on first surface portion 166. This has the practical effect of allowing the proximal end 172 of each auger finger 148 to extend farther into bearing block 180, and thus closer to cam shaft axis 166, when the proximal end contacts second surface portion, as compared to when the proximal end contacts the first surface portion. As such, when the proximal end 172 of each auger finger 148 rotates into alignment with first surface portion 166, the auger finger is projected outwardly from drum 136 to a "raking position", and when the proximal end rotates into alignment with second surface portion 168, the auger finger is retracted into drum, to a "release position". In the release portion, the distal end 174 of each auger finger 148 can project a small distance from drum wall 137, or be retracted inside its associated aperture 150.

Radially relieved second surface portions in accordance with the invention can be one continuous surface, or a discontinuous surface made up of a plurality of distinct surfaces or "faces". For example, second surface portions can have a polygonal shape, such as a shape with two or more flat faces adjacent to one another. In the present example, second surface portion 168 includes three faces 168*a*, 168*b*, and 168*c*. Face 168*a* extends between first surface portion 167 and face 168*b*. Face 168*b* extends between face 168*a* and 168*c*. Face 168*c* extends between face 168*b* and first surface portion 167. In this arrangement, faces 168*a*, 168*b*, and 168*c* form three contiguous sides of a polygon shape. All three faces 168*a*, 168*b*, and 168*c* are radially relieved as shown to permit proximal end 172 of auger finger 148 to extend closer to cam shaft axis 166 when the proximal end slides into engagement with each face.

Auger finger assemblies in accordance with the invention can include one or more biasing elements to maintain the proximal end of each auger finger 148 in constant engagement with the cam shaft 166. Biasing elements can include various spring mechanisms, such as tension springs, compression springs or other mechanisms for urging each auger finger into contact with cam shaft. Referring to FIG. 6, each auger finger 148 in the present example is maintained in contact with cam shaft 162 by a biasing mechanism 190. Biasing mechanism 190 includes a tension spring 192 coiled around a portion of auger finger 148. Spring 192 has a first end 194 and a second end 196 opposite the first end. First end 194 of spring 192 is wrapped around and attached to sleeve portion 186 of bearing block 180. Second end 196 of spring 192 is wrapped around and attached to a flange 148a. Flange 148a can be fixedly attached to auger finger 148, or be integrally formed with the auger finger as a single unitary body.

When the proximal end 172 of an auger finger 148 rotates into engagement with the first surface portion 166 of cam shaft 162 during operation, the first surface portion pushes the auger finger radially outwardly and into a raking position. Flange 148a moves outwardly with auger finger 148, pulling second end 196 of spring 192 radially outwardly relative to first end 194. Radially outward displacement of second end 196 stretches spring 192 from a more relaxed state to a more tensioned state, in which energy is stored in the spring 192. In this state, the tension in the second end 196 of spring 192 exerts a radially inward pulling force on flange 148a that biases auger finger 148 toward a more retracted position. When proximal end 172 of auger finger 148 subsequently rotates into engagement with the second surface portion 166 of cam shaft 162, i.e. the radially relieved portion of the shaft, some of the stored energy in spring 192 is released to move flange 148a and auger finger 148 radially inwardly to a more retracted position.

Figure 7:
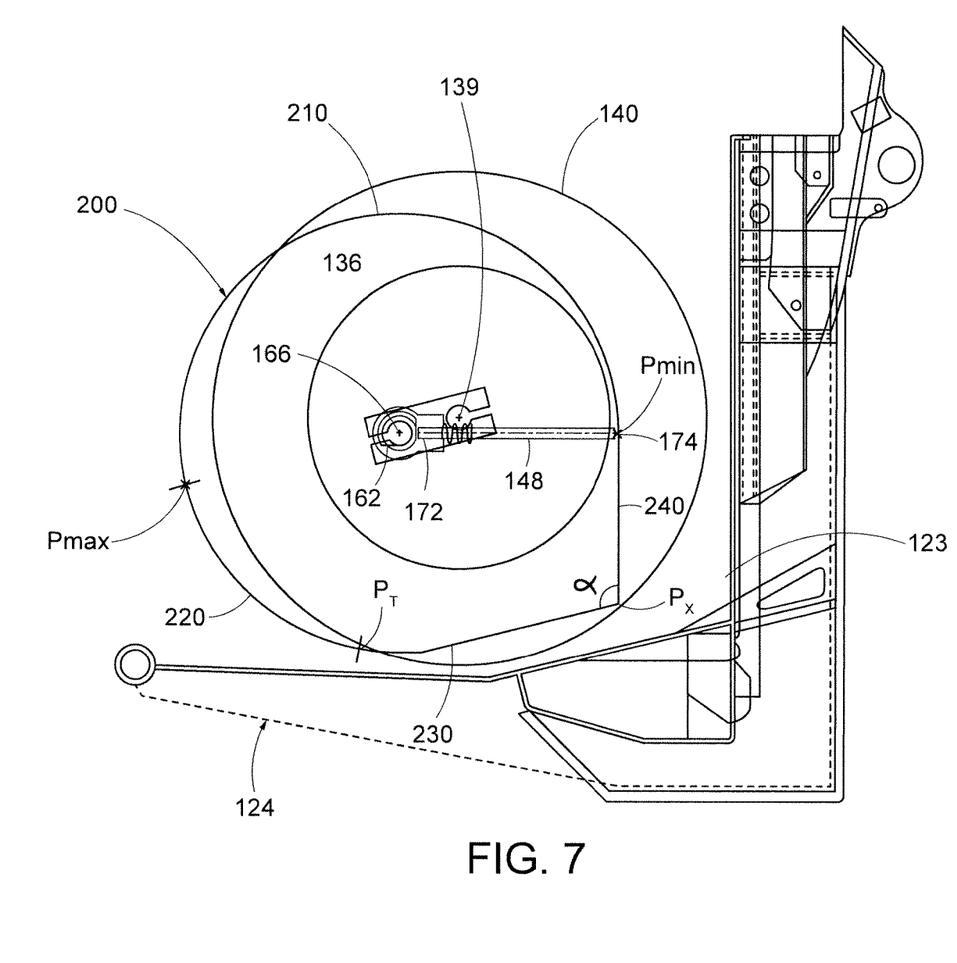
FIG. 7 is a side view of the rotary auger and auger finger assembly of FIG. 2, illustrating a path of revolution of one auger finger in the auger finger assembly.

Referring to FIG. 7, a path 200 taken by the distal end 174 of one of the auger fingers 148 is shown, as it would appear through one complete revolution of drum 136. Path 200 is seen in a side profile, along with the side profile of drum 136 and one of the auger flights 140. Path 200 includes a first path section 210 and a second path section 220 that both follow a common circular shape of trajectory. Path 200 also includes a third path section 230 and fourth path section 240 that follow an irregular polygonal shape of trajectory. Path section 210 represents the travel of distal end 174 when proximal end 172 of auger finger 148 initially engages and travels along first surface portion 167 of shaft 162. During this portion of the revolution, distal end 174 travels along a circular path. Due to the offset position of shaft axis 166 relative to drum axis 139, the distance or extent to which distal end 174 projects from drum 136 gradually increases as proximal end 172 travels along first surface portion 166, until the distal end reaches the fully projected position $P_{max}$. As distal end 174 travels toward the fully projected position $P_{max}$, the distal end assumes a raking position along the front of auger 134 that causes crop material to become caught on auger finger 148. Once distal end 174 travels past the point $P_{max}$, the distal end enters path section 220. Proximal end 172 continues to travel along first surface portion 166, but the distance or extent to which distal end 174 projects from drum 136 now decreases while continuing along the circular path. During this period of the revolution, distal end 174 remains in a raking position, and crop material remains attached to auger finger 148, so that the crop material is pulled toward the floor of header 124 and swept underneath drum 136.

Distal end 174 continues along path 220 until proximal end 172 of auger finger 148 aligns with second surface portion 168 of shaft 162. At this point, distal end 174 reaches a point of transition $P_T$ and enters path section 230, where it travels along an irregular polygonal shaped path. More specifically, distal end 174 travels along linear paths corresponding to the polygonal shape of second surface portion 168. During this period of the revolution, distal end 174 remains in a raking position, and crop material remains attached to auger finger 148, so that the crop material is pulled rearwardly beneath drum 136 and toward the inlet 123 of feeder 122.

Distal end 174 continues along path 230 until proximal end 172 of auger finger 148 aligns with a sharp or abrupt corner 169 on second surface portion. As proximal end 172 of auger finger 148 travels around corner 169, path section 230 makes an abrupt and sharp turn at point $P_X$, at which point distal end 174 enters fourth path section 240. Point $P_X$ is located in front of the inlet 123 to feeder 122. During this period of revolution, distal end 174 remains in a raking position, and crop material remains attached to auger finger 148, so that the crop material is pulled to the inlet 123 of feeder 122. However, the sharp angle α between third path section 230 and fourth path section 240 at point $P_X$ is such that distal end 174 retracts more rapidly into drum 136 as the distal end passes the inlet 123 to feeder 122. As distal end 174 travels along fourth path section 240, the distal end rapidly retracts into drum 136 until the distal end reaches a point of maximum retraction $P_{min}$. During this time, distal end 174 transitions to a release position in which crop material carried by distal end 174 is released at inlet 123 of feeder 122. Point $P_{min}$ is angularly offset from point $P_{max}$ by an angle of less than 180 degrees. Therefore, crop material is released from auger finger 148 at a point in the revolution much closer to $P_{max}$ than in conventional augers where the point $P_{min}$ is separated from the point $P_{max}$ by an angle of 180 degrees. Point $P_{min}$ also occurs along the circumference of drum 136 at a point before the distal end begins rotating back over top of drum. Therefore, auger finger 148 retracts into a fully retracted position to release crop material from the finger before the crop material is pulled over the top of drum 136, thereby preventing the crop material from combining with new crop material on the front facing side of the drum.

As seen in FIG. 7, each auger finger 148 oscillates in a reciprocating motion relative to the drum wall 137, as the finger and drum 136 revolve around drum axis 139. In this arrangement, each auger finger 148 is a cam follower that revolves around cam shaft 162. The distal end 174 of each auger finger 148 moves back and forth through one of the apertures 150 during each revolution. Augers in accordance with the invention can include one or more guiding mechanisms to provide a controlled movement of auger fingers through the apertures during each revolution. Referring to FIG. 5, each aperture 150 is fitted with a guide mechanism 154 in the form of a guide fitting 158. Each guide fitting 158 is mounted to drum 136 over one of the apertures 150 and includes a passage 159 that aligns with the aperture to allow an auger finger 148 to pass through the passage. Guide fitting 158 can be made of a smooth durable material, such as plastic, to protect the sidewalls 152 of apertures 150 from wear caused by contact with the auger fingers. Auger fingers 134 can also be made of plastic to reduce wear from contact with the aperture sidewalls 152.

What is claimed is:
1. A crop gathering system for an agricultural harvester, the crop gathering system comprising:
   a cylindrical tube comprising a tube wall and a longitudinal axis, the tube wall defining at least one aperture extending through the tube wall;

a rotary cam comprising an elongated shaft with a cam surface, the shaft extending inside the tube parallel to and radially offset from the longitudinal axis of the tube; and at least one cam follower, the at least one cam follower comprising a proximal end engaging the cam surface of the elongated shaft and a distal end aligned with the at least one aperture, wherein the at least one cam follower is displaceable through the at least one aperture between a fully extended position and a fully retracted position relative to the tube wall.

2. The crop gathering system of claim 1, wherein the cam surface comprises a first surface portion that is cylindrical and a second surface portion that is non-cylindrical.

3. The crop gathering system of claim 1, wherein the cam surface comprises a first surface portion that is cylindrical and a second surface portion that is radially relieved with respect to the first surface portion.

4. The crop gathering system of claim 1, wherein the cam surface comprises a first surface portion that is cylindrical and a second surface portion that is polygonal.

5. The crop gathering system of claim 1, wherein the cam surface comprises a first surface portion that is rounded.

6. The crop gathering system of claim 1, wherein the at least one cam follower extends normal to the shaft.

7. The crop gathering system of claim 1, wherein, in the fully extended position, the distal end of the at least one cam follower projects a maximum distance in a radially outward direction from the tube wall.

8. The crop gathering system of claim 1, wherein, in the fully retracted position, the distal end of the at least one cam follower projects a minimum distance in a radially outward direction from the tube wall.

9. The crop gathering system of claim 1, wherein, in the fully extended position, the proximal end of the at least one cam follower engages a first surface portion of the cam surface.

10. The crop gathering system of claim 9, wherein, in the fully retracted position, the proximal end of the at least one cam follower engages a second surface portion of the cam surface that is different from the first surface portion.

11. The crop gathering system of claim 1, wherein the fully extended position and the fully retracted position of the at least one cam follower are angularly offset from one another with respect to the longitudinal axis of the tube by an angle less than 180 degrees.

12. The crop gathering system of claim 11, wherein the angle is between about 120 degrees and about 160 degrees.

13. The crop gathering system of claim 1, further comprising at least one cam follower mount for connecting the at least one cam follower to the shaft.

14. The crop gathering system of claim 13, wherein the at least one cam follower mount comprises a block that is connected to the shaft and holds the proximal end of the at least one cam follower.

15. The crop gathering system of claim 13, wherein the at least one cam follower mount comprises a biasing element exerting a radially inward force on the at least one cam follower to maintain the proximal end of the at least one cam follower in constant engagement with the shaft.

16. The crop gathering system of claim 1, wherein the at least one cam follower is made of a plastic.

17. A crop gathering system for an agricultural harvester, the crop gathering system comprising:

a cylindrical tube comprising a tube wall and a longitudinal axis, the tube wall defining at least one aperture extending through the tube wall;

a rotary cam comprising an elongated shaft with a cam surface, the shaft extending inside the tube parallel to and radially offset from the longitudinal axis of the tube; and at least one cam follower, the at least one cam follower comprising a proximal end engaging the cam surface of the elongated shaft and a distal end aligned with the at least one aperture, wherein the at least one aperture comprises an aperture sidewall in engagement with the at least one cam follower.

18. A crop gathering system for an agricultural harvester, the crop gathering system comprising:

a cylindrical tube comprising a tube wall and a longitudinal axis, the tube wall defining at least one aperture extending through the tube wall;

a rotary cam comprising an elongated shaft with a cam surface, the shaft extending inside the tube parallel to and radially offset from the longitudinal axis of the tube; and at least one cam follower, the at least one cam follower comprising a proximal end engaging the cam surface of the elongated shaft and a distal end aligned with the at least one aperture, wherein the tube and the at least one cam follower are rotatable relative to the shaft in a first direction of rotation.

19. A crop gathering system for an agricultural harvester, the crop gathering system comprising:

a cylindrical tube comprising a tube wall and a longitudinal axis, the tube wall defining at least one aperture extending through the tube wall;

a rotary cam comprising an elongated shaft with a cam surface, the shaft extending inside the tube parallel to and radially offset from the longitudinal axis of the tube; and at least one cam follower, the at least one cam follower comprising a proximal end engaging the cam surface of the elongated shaft and a distal end aligned with the at least one aperture, wherein the at least one cam follower is displaceable through the at least one aperture in a reciprocating motion in response to rotation of the tube and the at least one cam follower about the shaft.

* * * * *